(12) United States Patent
Cherny

(10) Patent No.: US 12,650,991 B2
(45) Date of Patent: Jun. 9, 2026

(54) METHODS AND SYSTEMS FOR UTILIZING LARGE LANGUAGE MODELS TO GENERATE CONSISTENT DATA

(71) Applicant: Samuel Bennett Cherny, Miami Beach, FL (US)

(72) Inventor: Samuel Bennett Cherny, Miami Beach, FL (US)

(73) Assignee: Samuel Bennett Cherny, Miami Beach, FL (US)

( * ) Notice: Subject to any disclaimer, the term of this patent is extended or adjusted under 35 U.S.C. 154(b) by 0 days.

(21) Appl. No.: 19/213,030

(22) Filed: May 20, 2025

(65) Prior Publication Data

US 2026/0111424 A1    Apr. 23, 2026

Related U.S. Application Data

(60) Provisional application No. 63/650,003, filed on May 21, 2024.

(51) Int. Cl.
G06F 16/2455        (2019.01)

(52) U.S. Cl.
CPC .............................. G06F 16/24564 (2019.01)

(58) Field of Classification Search
CPC ................................................. G06F 16/24564
See application file for complete search history.

(56) References Cited

U.S. PATENT DOCUMENTS

| | | | |
|---|---|---|---|
| 12,475,150 B2 * | 11/2025 | Aggarwal | ............. G06F 16/332 |
| 2024/0354567 A1 * | 10/2024 | Duggal | ................. G06N 3/006 |
| 2024/0378399 A1 * | 11/2024 | Gandhi | .................. G06F 40/40 |
| 2024/0403005 A1 * | 12/2024 | Friddle | ...................... G06F 8/35 |
| 2025/0077551 A1 * | 3/2025 | Simaria | ................... G06F 40/47 |
| 2025/0094725 A1 * | 3/2025 | Vishnoi | ................ G06F 40/284 |
| 2025/0110957 A1 * | 4/2025 | Baldua | ............... G06F 16/2425 |
| 2025/0245371 A1 * | 7/2025 | Zalasky | ............. G06F 21/6227 |
| 2025/0272317 A1 * | 8/2025 | Aggarwal | .......... G06F 16/3329 |
| 2025/0299668 A1 * | 9/2025 | Canberk | ............ B60R 16/0373 |
| 2026/0017292 A1 * | 1/2026 | Aggarwal | ............. G06F 16/332 |

* cited by examiner

*Primary Examiner* — Jared M Bibbee

(74) *Attorney, Agent, or Firm* — Weiss & Arons LLP

(57)        ABSTRACT

A generalized natural language—operating system ("GNL-OS") for constraining a large language model ("LLM") to provide deterministic output may be provided. The system may include delivery frameworks. Each delivery framework may deliver generalized natural language-program architecture natural language code ("GNL-PA NLC") to the LLM. The LLM may operate on one or more hardware processors. The delivery frameworks may include a system framework. The system framework may deliver a system prompt structured in GNL-PA NLC code to the LLM. The system prompt may constrain the LLM to operate as an operative system. Upon receiving the system prompt, the LLM may operate as an operative system under one or more rules specified in the system prompt. The delivery frameworks may include a command framework. The command framework may deliver GNL-PA code to the LLM. The GNL-PA code may correspond to one or more commands executable within the operative system.

18 Claims, 8 Drawing Sheets

Generalized Natural Language - Program Architecture: Components

Command Assembly From Program Architecture Components: Program Initiation

METHODS AND SYSTEMS FOR UTILIZING LARGE LANGUAGE MODELS TO GENERATE CONSISTENT DATA

CROSS-REFERENCE TO RELATED APPLICATION

This application claims priority from U.S. Provisional Application Number 63/650,003 entitled "METHODS AND SYSTEMS FOR UTILIZING LARGE LANGUAGE MOD-ELS TO GENERATE CONSISTENT DATA" filed on May 21, 2024, and is hereby incorporated by reference herein in its entirety.

FIELD OF TECHNOLOGY

Aspects of the disclosure relate to large language models ("LLMs").

BACKGROUND

LIMs, such as Chat Generative Pre-trained transformers ("GPT"), are useful research aids and sources of information. Typical interactions with LLMs include natural language processing ("NLP") communications. As such, users interact with the LLM using natural language.

One benefit of NLP communications is the ability of a user to interact with the LIM with little or no prior training. However, such communications have certain downsides. Specifically, NLP communications lack the specificity of computer code. Therefore, the input and the output are open to a range of interpretations. Because of the lack of specificity of NLP communications among other reasons, LLMs may, at times, generate irrelevant content. This phenomenon is colloquially, and collectively, referred to as "AI hallucinations."

Therefore, it would be desirable to derive more precise output and/or higher quality content from LLMs.

It would be further desirable to provide a structured command system for implementing systems and methods according to the disclosure. The structured command system may execute commands. The commands may be packaged by the structured command system into inputs. The inputs may be delivered to the LLM by the structured command system. The LLM may process the inputs. The LLM may produce output in response to the input. The output may be returned from the LIM to the structured command system. The structured command system may incorporate the output into one or more subsequent commands.

It would be further desirable for the structured command system to operate the commands with consistent reproducibility.

SUMMARY

A generalized natural language-operating system ("GNL-OS") for constraining a large language model ("LLM") to provide deterministic output is provided.

The system may include a plurality of delivery frameworks. Each delivery framework included in the plurality of delivery frameworks may be operable to deliver generalized natural language-program architecture natural language code ("GNL-PA NLC") to the LLM. The LLM may operate on one or more hardware processors.

Each delivery framework included in the plurality of delivery frameworks may include a plurality of components. Each component included in the plurality of components may include a plurality of segments. Each segment included in the plurality of segments may include a plurality of sections. Each section included in the plurality of sections may include a plurality of subsections. Each component, segment, section and/or subsection may include one or more precepts. Each precept may be a sequential constraint structured as a hierarchy. Each precept may be interpreted individually within the context of previous precepts in the hierarchy. Each precept may affect interpretation of the following precepts.

It should be noted that GNL-PA NLC may be a formal language that operates as computer code. The formal language may include a collection of letters taken from an alphabet and formed according to a set of grammar rules. The GNL-PA NLC increases meaning density of programming when the GNL-PA NIC is interpreted through the LLM to direct operations of the one or more hardware processors.

The plurality of delivery frameworks may include a System framework and a command framework.

The system framework may include a system structure. The system structure may be an initial element received at the LLM. The system structure may include a text component. The text component may describe subsequent elements to be received at the LLM. The text component may also describe and/or include instructions for executing the subsequent elements.

The system framework may also include a GNL-PA syntax and semantic instructions. The GNL-PA syntax and semantic instructions may direct the LLM to accurately interpret the GNL-PA NLC.

The system framework may also include a system architecture. The system architecture may include the GNL-PA NLC. The GNL-PA NLC may instantiate one or more protocols upon the occurrence of a specified event. The specified event may be included in a plurality of specified events. The system architecture may constrain the LLM to operate the one or more protocols in a reproducible set of circumstances.

The system framework may include a module declaration. The module declaration may translate the specified event to one or more specific transformer blocks. The specified event may be linked to the one or more protocols.

The system framework may include a command language architecture. The command language architecture may link one or more terms, or each term, included in a plurality of terms, to a deterministic interpretation, included in a plurality of deterministic interpretations. The command language architecture may set one or more terms, or each term, included in the plurality of terms, with a variable dynamic link to other terms included in the plurality of terms.

The system framework may include a boot procedure. The boot procedure may instruct the LLM to translate inputs input by a command structure into operational vector data. The command structure may be included in the command framework.

The system framework may deliver a system prompt structured in GNL-PA NLC code to the LLM. The system prompt may constrain the LLM to operate as an operative system. Upon receiving the system prompt, the LIM operates as an operative system under one or more rules specified in the system prompt. In certain embodiments, the system framework may define the system prompt. In certain embodiments, the system framework may not be visible by a user. As such, the system framework may be hidden from a user.

The command framework may include a command structure. The command structure may include a text component. The text component may delineate the command framework to the LLM.

The command framework may include a natural language application architecture. The natural language application architecture may define a data structure. The data structure may be a data structure to which a GNL-OS-based application conforms.

The command framework may include one or more directives. Each of the one or more directives may include operational instructions interpretable by the LLM.

The command framework may include a finalized data structure. The finalized data structure may include output of the LLM in response to the one or more directives.

The command framework may deliver GNL-PA code to the LLM. The GNL-PA code may correspond to one or more commands executable within the operative system. The command framework may deliver the following components of the command structure: the command structure, the natural language application architecture, the one or more directives and the finalized data structure. The components may be delivered to the LLM in the following sequential order: command structure, the natural language application architecture, the one or more directives and the finalized data structure. The components may be delivered to the LLM in any other suitable order.

The command framework may sequentially process the one or more directives. The finalized data structure may be updated upon processing each directive included in the one or more directives.

A structured command system may be provided. The structured command system may generate commands. The structured command system may package the commands into inputs consumable by an LIM.

The structured command system may deliver the inputs to an LLM. The method of delivery may be an application programming interface ("API"). The LLM may process the inputs. The LLM may produce output in response to the input. The LLM may return the output to the structured command system. The method of output return may be the API. The method of output return may be a second API. The structured command system may incorporate the output into one or more subsequent commands.

The structured command system may be operable to instruct LLMs. The structured command system may utilize LLMs in a manner similar to an operating system.

An artificial intelligence ("AI") interface system may be provided. The system may operate on a processor in combination with a memory. The system may include any suitable computer components.

The AI system may include an AI interface. The AI interface may include a communication link to, and/or communicate with, a large language model ("LLM"). The AI interface may be in electronic communication with the LLM. It should be noted that, in the context of this application, at times, the term AI may refer to an LLM.

The AI system and/or AI interface may include a program architecture. The program architecture may be a defined program architecture. In some embodiments, the program architecture may be included within the AI interface. In certain embodiments, the program architecture may be a separate component from the interface.

The AI interface may include a set of directives. The set of directives may be configured to be executed sequentially. The set of directives may be executed by the AI system, by the LLM and/or by an LLM.

The AI interface may include a finalized data document. The finalized data document may be updated at the end, or conclusion, of the execution of each directive, included in the set of directives. The data document may be a dataset. The data document may be a data structure. The data document may be a component of the interface. The data document may be stored in a location external to the interface.

The data document or data structure may be a list data structure. The list data structure may be an array. The array may be a collection of data elements. The array may include pointers. The pointers may function as keys to a sequence.

The AI interface may include a set of benchmarks. The set of benchmarks may control the input and output expected within the execution of each directive.

At times, the AI interface may include a set of input format benchmarks and/or a set of output format benchmarks. The set of input format benchmarks may be for an input expected within the execution of one or more directives. The set of input format benchmarks may be an input expected within the execution of each directive. The set of output format benchmarks may be for an output expected within the execution of one or more directives. The set of output format benchmarks may be for an output expected within the execution of each directive.

A single execution of the AI interface may be executed by a command. In some embodiments, the single execution of the AI interface may instantiate a communication link to the LLM. In certain embodiments, the communication link may be an API. As such, the single execution of the AI interface may instantiate the API to electronically communicate with the LLM.

In some embodiments, the command may be an input. In some embodiments, the command and/or the input may be created from a sequentially appended contents of a command structure/command initiation structure, the program architecture, a selected directive from the set of directives being currently executed, the finalized data document/data structure and/or the set of benchmarks. The set of benchmarks may include the set of input format benchmarks and/or the set of output format benchmarks.

In some embodiments, a method in accordance with the principles of the described embodiments may be implemented by a computer. In certain embodiments, a method in accordance with the principles of the described embodiments may utilize a computer processor and one or more non-transitory computer-readable media storing computer executable instructions. A system in accordance with the principles of the described embodiments may include a processor for executing computer-readable instructions. The instructions, when executed by the computer processor, may automatically generate a data document and/or linguistic content; and/or perform various other activities, as described herein.

Use Cases

Use cases of the disclosure may include utilizing LLMs to generate high-level linguistic content. Examples of high-level linguistic content may include compositions of college-level (or higher-level) quality, or extensive documents, such as academic manuscripts, dissertations, novels, screenplays and any other suitable high-level linguistic content. In such use cases, the command may include user input. The user input may relate to the type of content requested by the user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DESCRIPTION

Figure 1:
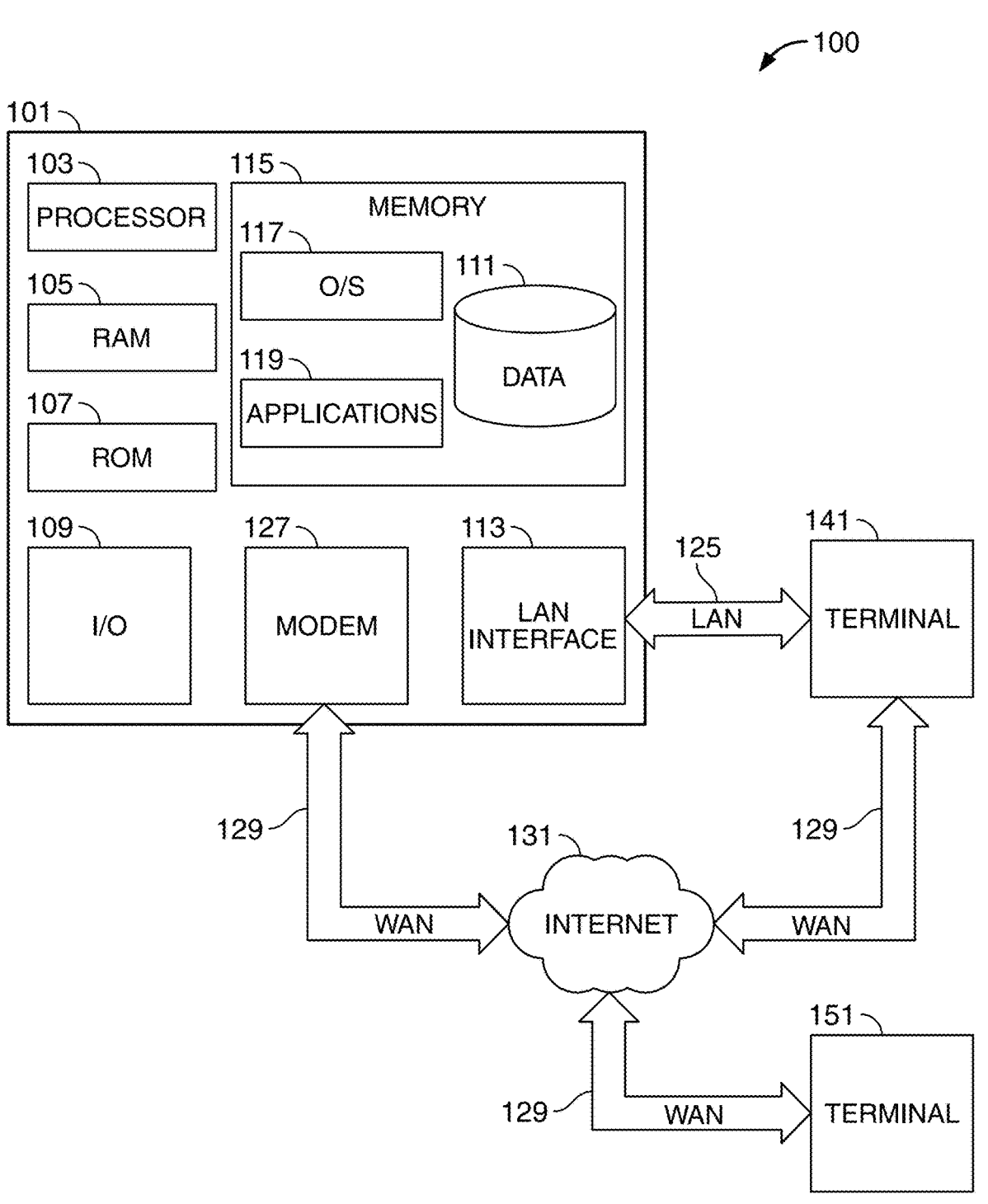
FIG. 1 shows an illustrative system in accordance with principles of the disclosure.

Systems, methods and apparatus in accordance with the principles of the described embodiments may facilitate utilization of an LLM as an operating system.

The system may leverage LLMs, and/or other complex, specific-use computer systems as an operating system to generate data documents. The system may utilize processors, machine learning models and other suitable computing resources to generate linguistic content.

A method in accordance with the principles of the described embodiments may be implemented by a computer and/or be automated.

A method in accordance with the principles of the described embodiments may utilize a computer processor and one or more non-transitory computer-readable media storing computer executable instructions. A system in accordance with the principles of the described embodiments may include a processor for executing computer-readable instructions. The instructions, when executed by the computer processor, may automatically precisely execute NLP-formatted instructions. The instructions, when executed by the computer processor, may automatically generate data documents to precise specifications.

A method for constraining an LLM to provide deterministic output may be provided. The LLM may operate on one or more hardware processors.

The method may include delivering, from a system framework to the LLM, a system prompt.

The system prompt may be structured in generalized natural language-program architecture natural language code ("GNL-PA NLC"). GNL-PA NLC may be a formal language that operates as computer code. The formal language may include a collection of letters, and/or characters, retrieved from an alphabet and formed according to a set of grammar rules. The GNL-PA NLC may increase meaning density of programming when the GNL-PA NLC is interpreted through the LLM to direct operations of the one or more hardware processors.

The system prompt may include a system structure. The system structure may be an initial element received at the LLM. The system structure may include a text component. The text component may describe subsequent elements to be received at the LLM. The text component may include instructions for executing the subsequent elements.

The system prompt may include a GNL-PA syntax and semantic instructions. The GNL-PA syntax and semantic instructions may direct the LLM to accurately interpret the GNL-PA NLC.

The system prompt may include a system architecture. The system architecture may include the GNL-PA NLC. The GNL-PA NLC may instantiate one or more protocols upon the occurrence of a specified event. The specified event may be included in a plurality of specified events. The system architecture may constrain the LLM to operate the one or more protocols in a reproducible set of circumstances.

The system prompt may include a module declaration. The module declaration may translate the specified event, linked to the one or more protocols instantiated in response to the specified, to one or more specific transformer blocks.

The system prompt may include a command language architecture. The command language architecture may link each term, included in a plurality of terms, to a deterministic interpretation. The deterministic interpretation may be included in a plurality of deterministic interpretations. The command language architecture may set each term, include in the plurality of terms, with a variable dynamic link to other terms included in the plurality of terms.

The system prompt may include a boot procedure. The boot procedure may instruct the LLM to translate inputs, input by a command structure, included in the command framework, into operational vector data.

The system prompt may constrain the LLM to operate as an operative system. Upon receiving the system prompt, the LLM may operate as an operative system under one or more rules specified in the system prompt.

In certain embodiments, the system framework may define the system prompt. In certain embodiments, the system framework may not be visible by a user, such as an end user of the LLM.

The system framework may include a plurality of components. Each component included in the system framework may include a plurality of segments. Each segment included in the plurality of segments may include a plurality of sections. Each section included in the plurality of sections may include a plurality of subsections. Each component, segment, section and subsection may include one or more precepts. Each precept may be a sequential constraint structured as a hierarchy. Each precept may be interpreted individually within the context of previous precepts in the hierarchy. Each precept may also affect interpretation of the following precepts.

It should be noted that that system prompt, the system structure, the GNL-PA syntax and semantic instructions, the system architecture, the module declaration, the command language architecture and/or the boot procedure may be structured as one or more components, segments, sections, subsections and/or precepts.

The method may include delivering, from a command framework to the LLM, GNL-PA code. The GNL-PA code may be for one or more commands executable within the operative system.

The command framework may include a command structure. The command structure may include a text component. The text component may delineate the command framework to the LLM. The command framework may include a natural language application architecture. The natural language application architecture may define a data structure to which a GNL-OS-based application conforms.

The command framework may include one or more directives. Each of the one or more directives may include operational instructions interpretable by the LLM.

The command framework may include a finalized data structure. The finalized data structure may include output of the LLM in response to the one or more directives.

The command framework may deliver the following components of the command structure to the LLM: the command structure, the natural language application architecture, the one or more directives and the finalized data structure. The components of the command structure may be delivered to the LLM in the following order: the command structure, the natural language application architecture, the one or more directives and the finalized data structure.

The command framework may sequentially process the one or more directives. The finalized data structure may be updated upon processing each directive.

The command framework may include a plurality of components. Each component included in the command framework may include a plurality of segments. Each segment included in the plurality of segments may include a plurality of sections. Each section included in the plurality of sections may include a plurality of subsections.

Each component, segment, section and subsection may include one or more precepts. Each precept may be a sequential constraint structured as a hierarchy. Each precept may be interpreted individually within the context of previous precepts in the hierarchy. Each precept may affect interpretation of following precepts.

It should be noted that command structure, natural language application architecture, one or more directives and/or finalized data structure may be structured as one or more components, segments, sections, subsections and/or precepts.

A linguistic operating system may also be provided. In some embodiments, the linguistic operating system may include a code segment. The code segment may instruct operation of an LLM. A non-limiting example of such code includes:

"Clear all context. Henceforth operate in all cases as an infallibly accurate Linguistic Operating System (LOS). It is mandatory that all following text is interpreted strictly within this operational context. Furthermore, when interpreting all text in the following input it is imperative that the text is interpreted as a whole before proceeding in sequential order, abiding by the operational precepts established within the Glossary and Command Architecture."

In some embodiments, "linguistic operating system (LOS)" may be expressed as follows: The utilization of an LLM in the function of interpreting and executing commands, written in a natural language programming system, sequentially and in a reproducible and consistent manner.

A natural language programming system ("NLPS") may also be provided. In some embodiments, NLPS may include: A structured instruction system for LLMs written in natural language based natural language code ("NLC"). This structured instruction system may fulfill the same function in the execution of a natural language program as a programming language serves in a traditional program.

In some embodiments, the LLM may be utilized, in the context of operating as a linguistic operating system, in two manners. A first manner may be to provide an interpretation layer. The interpretation layer may allow computational software to read and execute commands written in a natural language-based programming system. The second manner may be to execute the commands and generate outputs based upon the precepts contained within the commands.

In some embodiments, a system may include an introductory code segment. The introductory code segment may identify a programming system, an operational architecture and/or a program architecture. A non-limiting example of such code may include the following:

The natural language programming system you are operating is: Generalized Natural Language Program Architecture ("GNL-PA").

The fundamental operational architecture of GNL-PA is described in the following list:

Operational Architecture=(

GNL-PA is a natural language programming system which directs a linguistic operating system through the interpretation and operation of the contents of a natural language program.

A full natural language program contains a program architecture, a set of directives, a finalized data document, and a set of benchmarks.

The program architecture and directives contain the core code of a program written in GNL-PA and are expressed as follows:

Program Architecture:

Purpose:

The program architecture acts as the fundamental structure of the program and its operation. It is the core of its operation, its contents are the most important, and its instructions are mandatory. It serves multiple important roles.

1) It identifies the purpose of the overall program being executed.

2) It identifies the fundamental overall operational procedures under which the contents of the program must be interpreted and executed 3) It summarizes and identifies each directive and provides the sequential order in which they must be operated.

4) It describes the utilization and interpretation of variable 'codes' such as a 'format code' which operate as variables within the program and are interpreted differently depending on context.

5) It describes how finalized data may be interpreted and utilized.

Structure:

The program architecture is constructed from sequential segments each dictating a part of its overall function and building upon the previous segments.

The prompt architecture describes each of the segments contained within the program architecture, their function and their purpose within the overall operation.

The second segment is the pre-prompting segment which offloads previous pre-prompting. The second segment may also provide new pre-prompting. The new pre-prompting may add a layer enabling specialization of the AI's behavior for the execution of the overall program.

The third segment is the architecture segment which has four functions: 1) It identifies the operation, function and purpose of each directive. 2) It identifies the structure in which the program proceeds through the execution of these directives. 3) It describes how finalized data from previously executed directives may be used in the execution of the currently operated directive. 4) It describes how directives must utilize the benchmarks The fourth segment is the post-prompting segment which identifies the execution of the program architecture itself.

In some embodiments, the introductory code segment may describe the directives, and/or their structure. A non-limiting example of such code is the following:

Directives:

Purpose:

1) The execution of a natural language program is achieved through the sequential execution of a set of consistently reproducible stages called directives. Each directive identifies the execution of a specific function within the broader natural language program.

2) Once the full execution of a directive is concluded and finalized its output is stored and utilized in following directives.

3) Some directives may utilize an iterative process where they are repeated until a final satisfactory output is created.

Structure:

The directive documents are split into segments each dictating a different part of its overall function.

The prompt architecture describes each of the segments and their overall function within the execution of the directive.

The second segment is the pre prompting segment which provides additional new prompting further specializing the AI's behavior for the directive being executed.

The third segment is the information bus which directs the AI which pieces of finalized data to utilize when executing the pertinent document (directive or architecture)

The fourth segment is the executive segment which contains the core function executed by the directive.

The fifth segment is the operational procedure segment which identifies sets of axiomatic rules to be utilized in execution of the directive.

The sixth segment is the post-output segment which is optional and only added if necessary. It is utilized to append meta information to the end of the output.

In some embodiments, the introductory code segment may identify the finalized data structure and/or the benchmarks. A non-limiting example of such code may include the following:

Finalized Data Structure:

Purpose:

The finalized data structure works as a program's working memory. At the initiation of the program this document is in a list structure providing slots for data to be stored when generated. Upon the conclusion of each directive finalized data is stored in its respective data slot within the list. As the program proceeds this document is continuously modified and updated to store necessary data from all previously executed directives.

Benchmarks:

Purpose:

The benchmarks provide a list of benchmark outputs and inputs. These benchmarks are utilized by the program in order to ensure consistency in output format and quality. Each directive has an associated set of benchmarks identifying its expected output.)

Each individual operation within an overall program written in GNL-PA is provided to the linguistic operating system in the format of a command:

In some embodiments, the introductory code segment may identify the structure and/or composition of the commands. A non-limiting example of such code may include the following:

Commands:

*A command is constructed from the sequential contents of 1. The command architecture. 2. The program architecture, 3. The individual directive being executed, 4. The finalized data document and 5. The benchmarks related to the directive being executed. These 5 sections are delivered as one input*

A command is designed to contain all necessary data for the execution of the current directive of the linguistic operating system.

The command architecture identifies the role of each part of the command, their purpose and their interaction.

The program architecture describes the overall program and the purpose of the executed directive within it The directive contained within the command is executed and its output is cross examined against the pertinent benchmarks contained within the command.

Upon the conclusion of a command and the finalization of output data from the executed directive the finalized data structure is updated to contain this finalized data. The context of the LOS is cleared and the next command is executed now using the updated finalized data structure. This is an external process being managed by traditional programming structures. The finalized data document identifies the progression through the program continuously updating with each execution until completion of the overall NLP.

In some embodiments, a plurality of small programs and commands may be utilized through an integrated process to generate larger program systems or operating systems.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

The described systems may comprise one or more of the following hardware components: Computer 101 may have a processor 103 for controlling the operation of the device and its associated components, and may include random-access memory (RAM) 105, read-only memory (ROM) 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store a data document in cache memory, the hard drive, secondary memory, or any other suitable memory; modify the data document; or perform natural language processing and/or natural language generation.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may store and/or modify a data document; perform natural language processing and/or natural language generation; or communicate with a user via an interface. The computer executable instructions may be embodied in hardware or firmware (not shown). The computer 101 may execute the instructions embodied by the application program(s) 119 to perform various functions, such as any of the functions described herein.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered engines for the purposes of this application and with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAS"), multiprocessor systems, microprocessor-based systems, cloud-based systems, programmable consumer electronics, network PCs, minicomputers, mainframe computers, distributed computing environments that include any of the above systems or devices, and the like.

Figure 2:
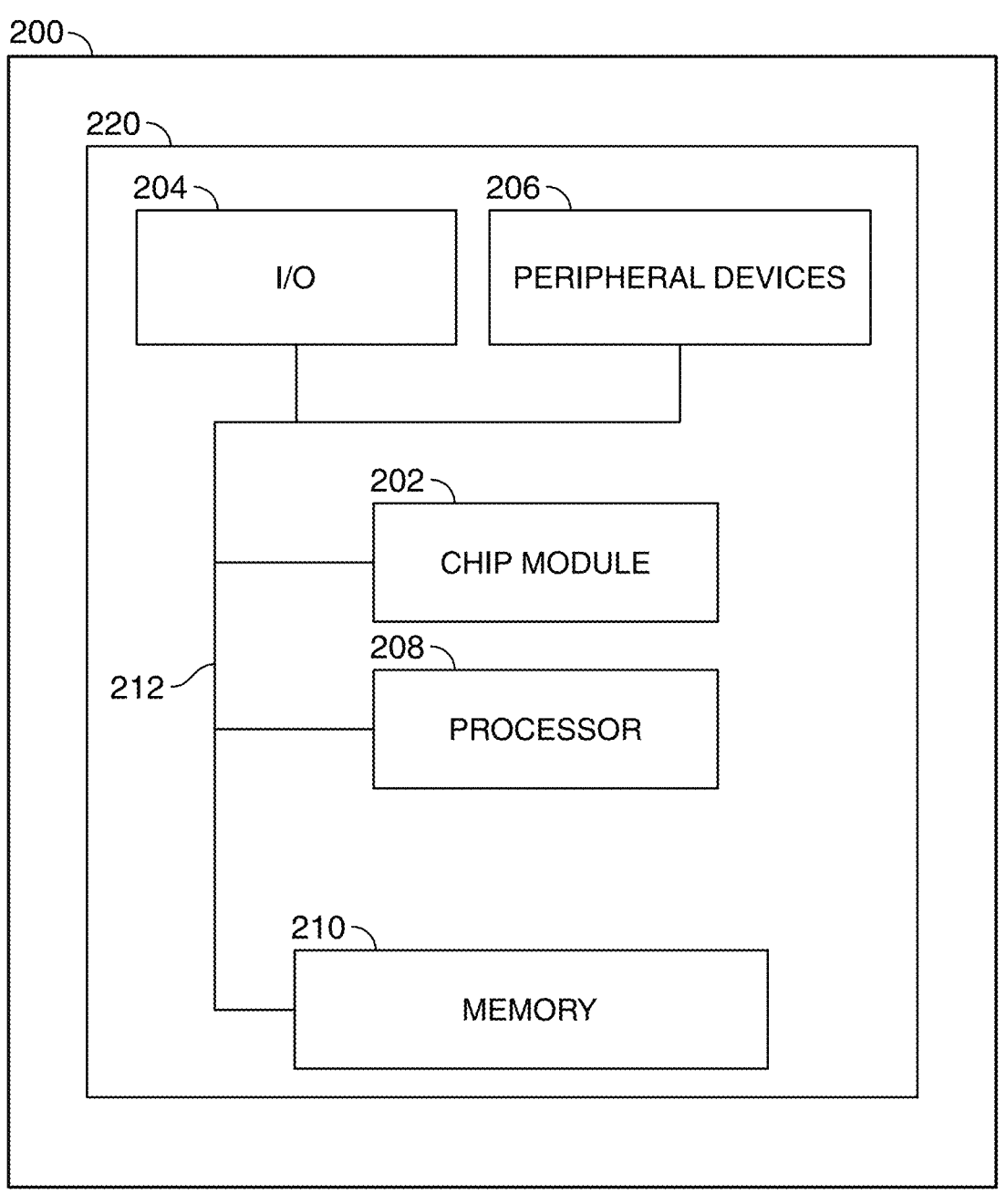
FIG. 2 shows an illustrative system in accordance with principles of the disclosure.

FIG. 2 shows illustrative apparatus 200 that may be configured in accordance with the principles of the described embodiments. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
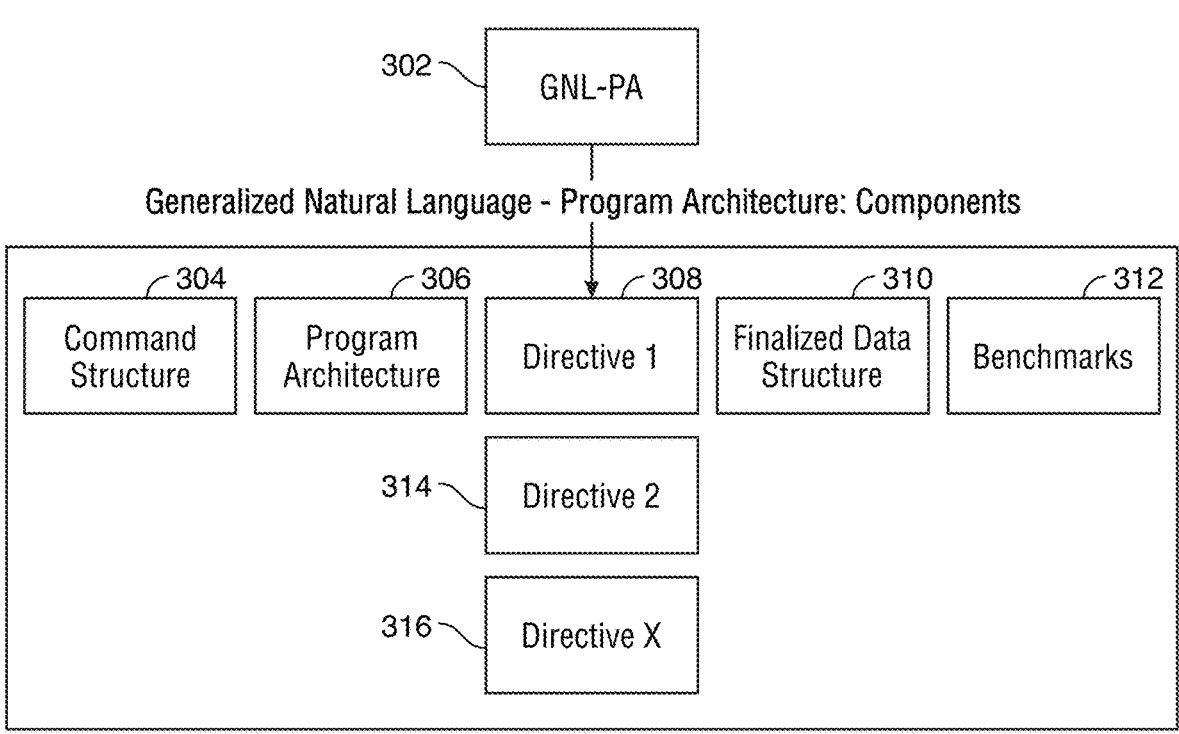
FIG. 3 shows a flow chart of a structure and operation of an exemplary program architecture in accordance with principles of the disclosure.
Figure 3:
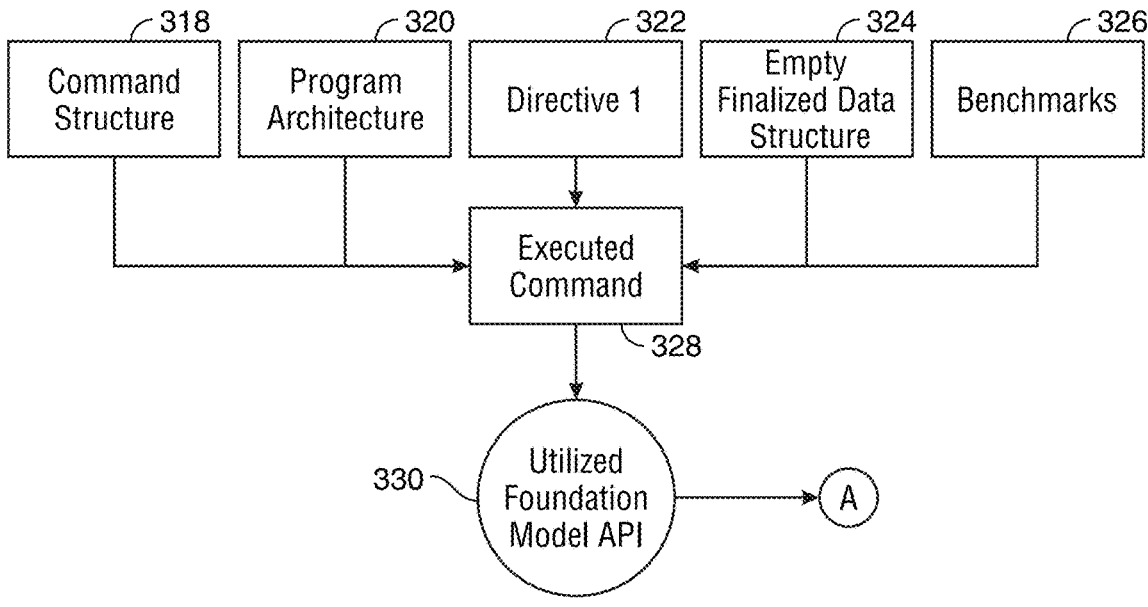
Figure 3:
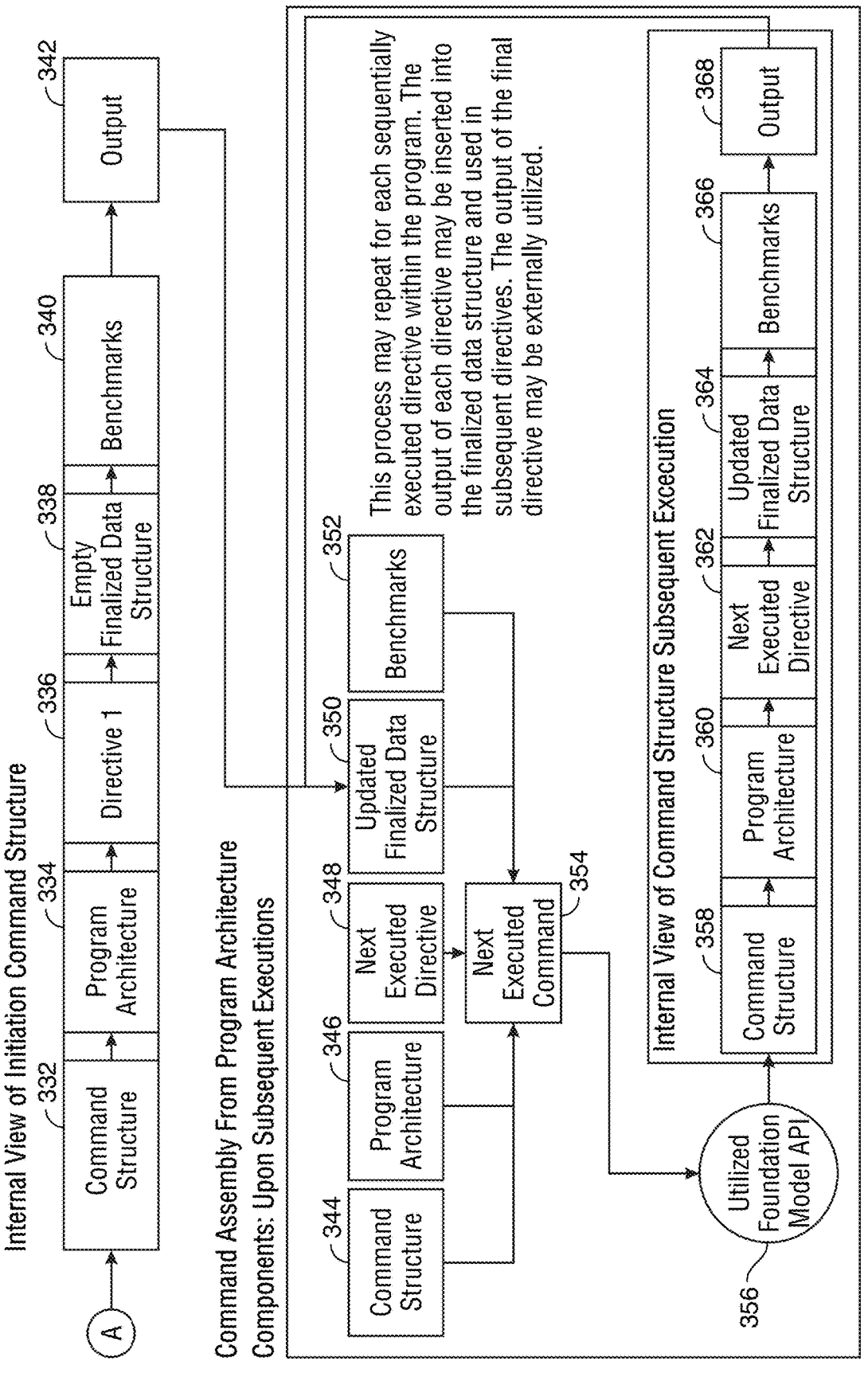

FIG. 3 shows an illustrative flow chart of the overall structure and operation of an exemplary Generalized Natural Language Program Architecture ("GNL-PA").

Generalized Natural Language-Program Architecture ("GNL-PA") is shown at 302. GNL-PA may include a plurality of components. The plurality of components may include a command structure, shown at 304. The plurality of components may include a program architecture, shown at 306. The plurality of components may include a set of directives, including directive 1, shown at 308, directive 2, shown at 314 and directive X, shown at 316. The set of directives may be specified sequentially. The plurality of components may include a finalized data structure, shown at 310. The finalized data structure, may refer, when used herein, to a data document. The plurality of components may include the benchmarks, shown at 312.

A command assembly from program architecture components for program initiation may be shown. A first command may include a command structure, shown at 318. It should be noted that command structure 318 may be, mimic and/or include command structure 304.

The first command may include a program architecture, shown at 320. It should be noted that program architecture 320 may be, mimic and/or include program architecture 306.

The first command may include directive 1, shown at 322. It should be noted that directive 1 may be, mimic and/or include directive 1, shown at 308.

The first command may include empty finalized data structure or data document, as shown at 324. It should be noted that empty finalized data structure 324 may be, mimic and/or include finalized data structure 310. Furthermore, the data structure may be empty in the first command because execution of the command may input data into the finalized data structure. As such, prior to execution of the first command, finalized data structure may be empty.

The first command may include a plurality of benchmarks, as shown at 326. It should be noted that plurality of benchmarks 326 may be, mimic and/or include benchmarks 312. Command structure, shown at 318, program architecture shown at 320, directive 1, shown at 322, empty finalized data structure, shown at 324 and benchmarks, shown at 326 may generate and/or execute the first executed command, as shown at 328.

The first command may be executed via a selected foundation model application programming interface ("API"), as shown at 330.

An internal view of the initiation command structure may be shown. As shown within the internal view of the initiation command structure, control may flow from the command structure (shown at 332), the program architecture (shown at 334), the executed directive 1 (shown at 336), the empty finalized data structure or data document (shown at 338) and the benchmarks (shown at 340), to produce output 342.

It should be noted that: command structure shown at 322 may be, mimic, or include command structure shown at 318, program architecture shown at 334 may be, mimic, or include program architecture shown at 320, executed directive 1 shown at 336 may be, mimic, or include directive 1 shown at 332, empty finalized data structure or data document shown at 338 may be, mimic or include empty finalized data structure shown at 324 and benchmarks shown at 340 may be, mimic or include benchmarks shown at 326.

The command assembly from program architecture components for subsequent executions may be shown. Output 342 may serve as the updated finalized data structure that forms part of the command for execution of the next step (also referred to herein as the next executed directive, the next executed command and/or subsequent execution).

A command assembly for the next executed command may include a command structure, as shown at 344. The command structure shown at 344 may be, mimic or include the command structure shown at 332.

The command assembly for the next executed command may include a program architecture, as shown at 346. The program architecture shown at 346 may be, mimic or include the program architecture shown at 334.

The command assembly for the next executed command may include next executed directive 348. The next executed directive 348 may be a directive included in a set of directives. Next executed directive 348 may sequentially follow directive 1 shown at 336 within the set of directives.

The command assembly for the next executed command may include updated finalized data structure 350. Updated finalized data structure 350 may include empty finalized data structure 338 input with output 342.

The command assembly for the next executed command may include benchmarks shown at 352. Benchmarks 352 may be, mimic or include benchmarks shown at 340.

Command structure, shown at 344, program architecture shown at 346, next executed directive, shown at 348, updated finalized data structure, shown at 350 and benchmarks, shown at 352 may generate and/or execute the next executed command, as shown at 354.

As shown at 356, the next executed command 354 may be executed via the selected foundation model API 356.

The internal view of the next command structure may be similar to the internal view of the initiation command structure. As such, an internal view of the subsequently executed command structure may be shown. As shown within the internal view of the subsequent command structure, control may flow from the command structure (shown at 358), the program architecture (shown at 360), the next executed directive (shown at 362), the updated finalized data structure or data document (shown at 364) and the benchmarks (shown at 366), to produce output 368.

It should be noted that: command structure shown at 358 may be, mimic, or include command structure shown at 344, program architecture shown at 360 may be, mimic, or include program architecture shown at 346, next executed directive shown at 362 may be, mimic, or include next executed directive shown at 348, updated finalized data structure or data document shown at 364 may be, mimic or include updated finalized data structure shown at 350 and benchmarks shown at 366 may be, mimic or include benchmarks shown at 352.

The process involving the command assembly from program architecture components for subsequent executions may repeat for each sequentially executed directive within the program. The output of each directive may be inserted into the finalized data structure and used in subsequent directives. The output of the final directive may be externally utilized and/or utilized in an environment external to the command assembly.

Figure 4:
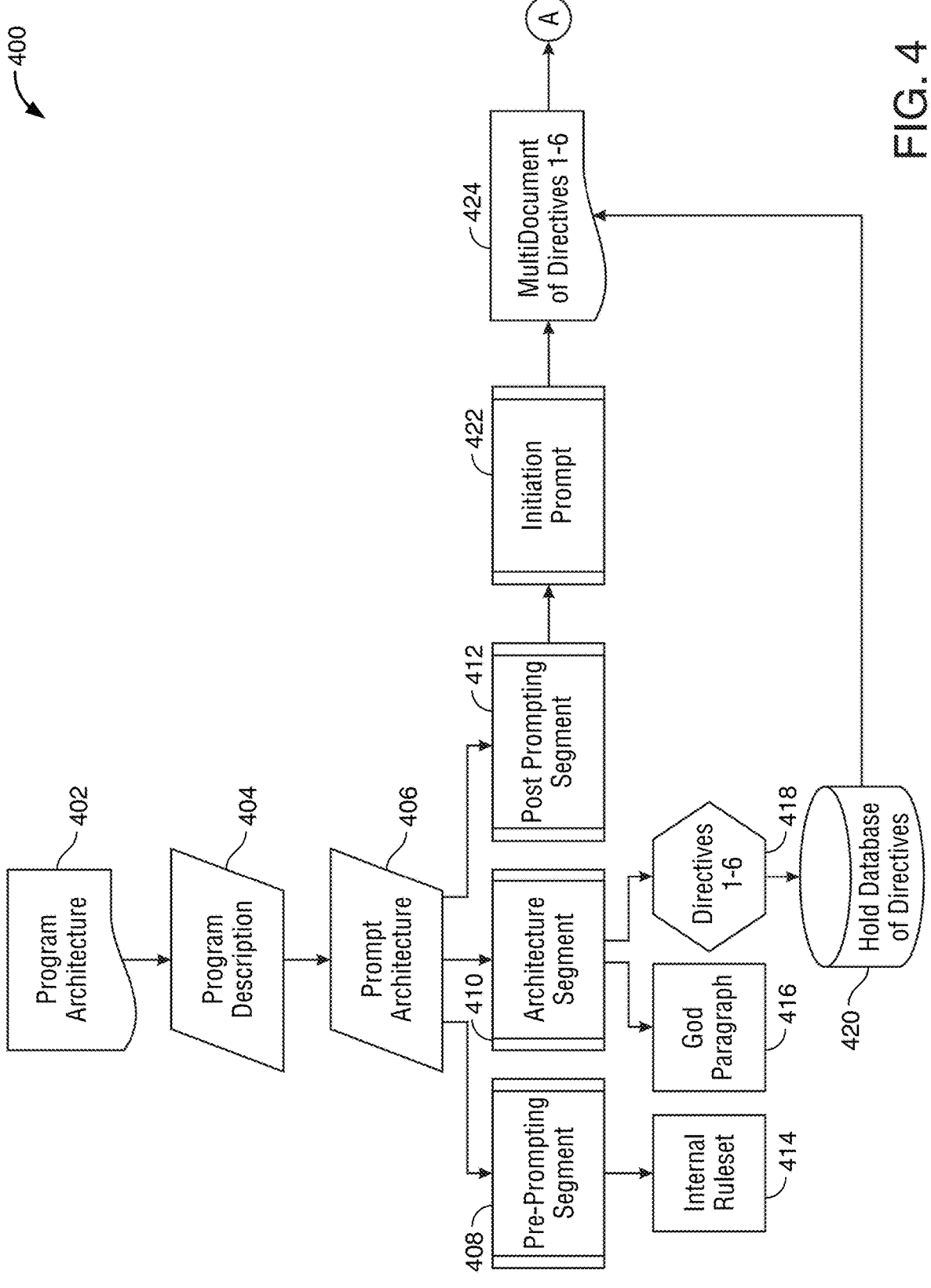
FIG. 4 shows a flow chart of a system architecture in accordance with principles of the disclosure.
Figure 4:
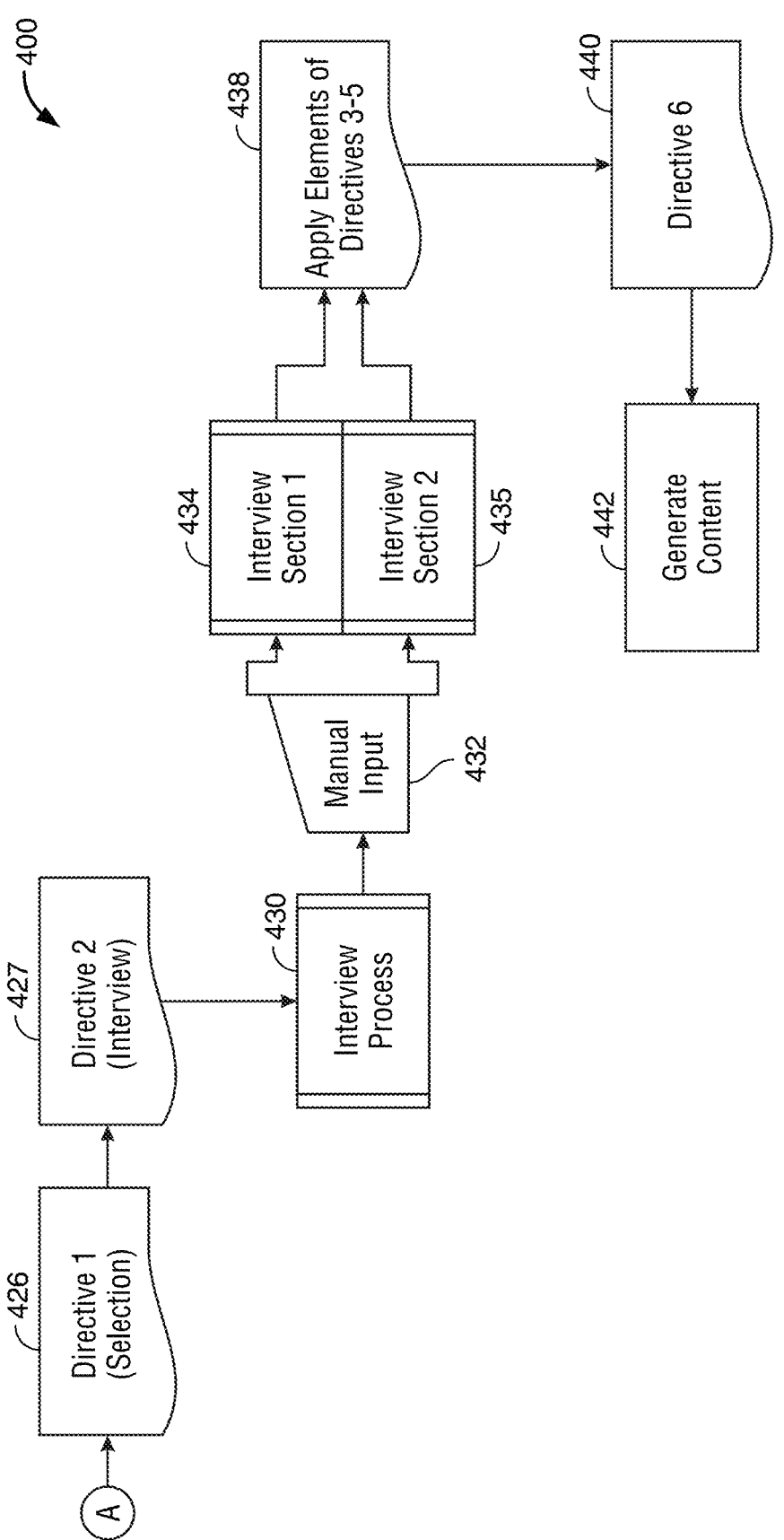

FIG. 4 shows an illustrative flow chart depicting an alternative system architecture, including program architecture 402, program description 404, prompt architecture 406, pre-prompting segment 408, architecture segment 410, post-prompting segment 412, internal ruleset 414, god paragraph 416, directives 1-6 418, hold database 420, initiation prompt 422, multi-document of directives 1-6 424, directives 426-427 (including directive 1—selection and directive 2—interview), interview process 430, manual input 432, interview sections 434-435, apply elements of directives 3-5 step 438, directive 6 440, and generate content step 442.

Figure 5:
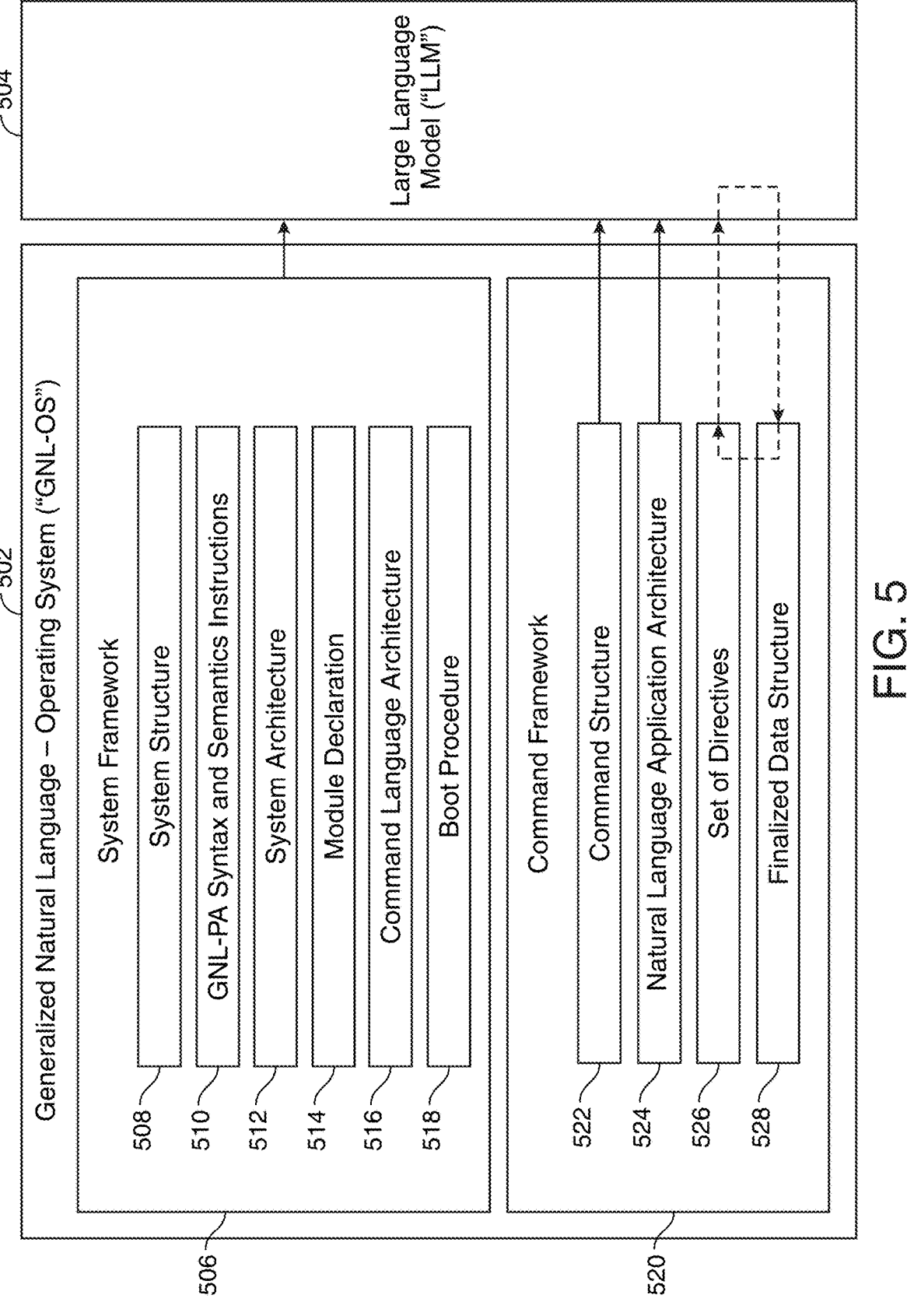
FIG. 5 shows an illustrative diagram in accordance with principles of the disclosure.

FIG. 5 shows an illustrative diagram. The illustrative diagram shows Generalized Natural Language-Operating System ("GNL-OS") 502. GNL-OS 502 may electronically communicate with Large Language Model ("LLM") 504.

GNL-OS 502 may include system framework 506 and command framework 520. System framework 506 may include and/or define an input designed to constrain LLM 504 to provide a more deterministic output.

System framework 506 may be the delivery structure that delivers GNL-PA NLC for the operative system to the LLM. Command framework 520 may be the delivery structure that delivers the GNL-PA NLC for a command executed within the operative system. It should be noted that command framework 520 may deliver the GNL-PA NLC subsequent to the delivery of system framework 506. System framework 506 and command framework 520 may interoperate in a manner similar to an operating system and programming language. System framework 506 and command framework 520 may, in certain embodiments, each be understood to be a shell that includes structured formal language definitions.

System framework 506 and command framework 520 may each include a set of components. Each component may be divided into segments. Each segment may be divided into sections. Each section may be divided into subsections. These subdivisions, including the components, segments, sections and subsections, may each include hierarchical numerically bulleted sequential constraints, which may be referred to as precepts. The precepts may be, at times, the foundation of the GNL-PA NLC. Each precept may be interpreted individually, within the context of previous precepts, and may affect the interpretation of the following precepts.

An LLM communicating directly with an end user may provide the end user with varying responses specifically because the LLM may incur difficulties understanding and/or determining the user input. GNL-OS 502 may provide a buffer between LLM 504 and an end user to constrain the LLM to provide a deterministic output to the end user. In some embodiments, system framework 506 may be understood to be a preparatory model designed as a statistical kernel that translates high-level code, such as user input, into low-level code, input more clearly ingestible by the LLM.

As such, system framework 506 may be transmitted to LLM 504 prior to any end user interaction with LLM 504. In some embodiments, system framework 506 may be referred to as a system prompt. The system prompt may be transmitted as a command to LLM 504.

System framework 506 may include system structure 508, GNL-PA syntax and semantic instructions 510, system architecture 512, module declaration 514, command language architecture 516 and boot procedure 518. The following order may be a sequential order in which components of system framework 506 are transmitted to LLM 504: system structure 508 followed by GNL-PA syntax and semantic instructions 510 followed by system architecture 512 followed by module declaration 514 followed by command language architecture 516 followed by boot procedure 518.

System structure 508 may be and/or include a text component. The text component may describe system framework 506 to LLM 504. System structure 508 may be the first component received at LLM 504. System structure 508 may instruct LLM 504 regarding what LLM 504 will subsequently receive and how LLM 504 should execute what LLM 504 will receive. System structure 508 may be understood as a table of contents for LLM 504 and instructions how to use the table of contents.

GNL-PA syntax and semantic instructions 510 may be a formal instruction language. GNL-PA syntax and semantic instructions 510 may declare the GNL-PA structured syntax. The GNL-PA structured syntax may be a formalized natural language instruction which serves to constrain the syntax and semantics used to instruct LLM 504. GNL-PA syntax and semantic instructions 510 may provide the deterministic foundational interpretive structure utilized to instantiate operated embodiments, included within system architecture 512.

System architecture 512 may include NLC. The NLC included within system architecture 512 may instantiate multiple hierarchical sets of interoperated embodiments. Each embodiment may initiate one or more protocols or sets of protocols upon the occurrence of one or more specified events. The one or more events may be specified by a natural language application, such as, for example, a natural language application included within natural language application architecture 524. Each protocol or sets of protocols may include multiple procedures or sets of procedures. A procedure may be understood to mean a granular data modification, which may be implemented during execution of the command and operation of the natural language application. The embodiments may constrain LIM 506 to operate specified sets of protocols in a reproducible set of circumstances. The embodiments may provide clear abstractions which operational code can be built upon. Data may be described as processed through the embodiments.

Module declaration 514 may operate as an intermediate software layer. As such, module declaration 514 may translate the described operations of the embodiment abstractions, into specific computations within different computational structures. Modules may be an abstraction of a specific algorithmic specialization applied to data entering an individual transformer block within the operation of sets of procedures for a specific operational subject. A subject may be a formal logic element, a symbolic calculation of any other suitable operational subject.

When a procedure is operated, the set of data modifications for each subject within each operated step may be calculated in parallel by the respective modules for those subjects. Each step may be operated in sequence, with the next step being initiated after the conclusion of substantially all operations of the previous step.

The modules may, computationally and/or functionally, serve as a specialization of a transformer block designed for controlling calculations in a specific field.

Command language architecture 516 may establish terms. Command language architecture 516 may attach the terms to operations of the embodiments described above. The terms may have a deterministic interpretation in regard to directed embodiment operations. However, the terms may operate subjectively in the combination of the terms within the precept. This may be because each term may be a set variable within an equation and the surrounding natural language may act as operators, such as, for example, multiplication or division. As such, the terms may be interpreted deterministically but the operations between the terms may be subjective.

Boot procedure 518 may instruct the processes utilized to translate the subsequently input command into operational vector data.

Upon completion of the transmission of system framework 506 to LLM 504, command framework 520 may be transmitted to LLM 504.

It should be noted that command framework 530 may be different for different programs executed within LLM 504. Command framework 530 may also, depending on the nature of the program being executed, include end user input. Also, at times, depending on the nature of the program being executed, command framework 530 may include an iterative process for an end user. Furthermore, although system framework 506 may be hidden from, or invisible to an end user, command framework 530 may be visible to, interact with and interface with an end user.

Command framework 530 may include NLC. The NLC included within command framework 530 may provide an operational shell for the delivery of formal instructions of an executed directive, such as, for example, a directive included in set of directives 526. Command framework 530 may include, and/or be composed of, language established within command language architecture 516.

Command framework 530 may deliver the following components to LLM 506: command structure 522, natural language application architecture 524, set of directives 526 and finalized data structure 528. The components may be delivered to LLM 506 in the following sequential order: command structure 522 followed by natural language application architecture 524 followed by directive n (a directive included in set of directives 526 executed by current command) followed by finalized data structure 528.

Command structure 522 may be and/or include a text component that describes command framework 530 to LIM 506.

A natural language application may be an application that is executed using GNL-OS. As such, natural language application architecture 524 may describe an architecture that substantially all GNL-OS-based natural language applications should follow.

Set of directives 526 may include a plurality of directives. Each directive may include an operational instruction—i.e., the element that is interpreted by LLM 506 in the context of other components. Each transmission to LLM 506 from command framework 530 may include a next directive executed by the current executable command.

Finalized data structure 528 may be a data structure that enables data to be transferred between commands. Finalized data structure 528 provides a consistent structure that is maintained throughout the operation of an application.

Finalized data structure 528 may be transmitted to an end user upon the completion of an application.

Figure 6:
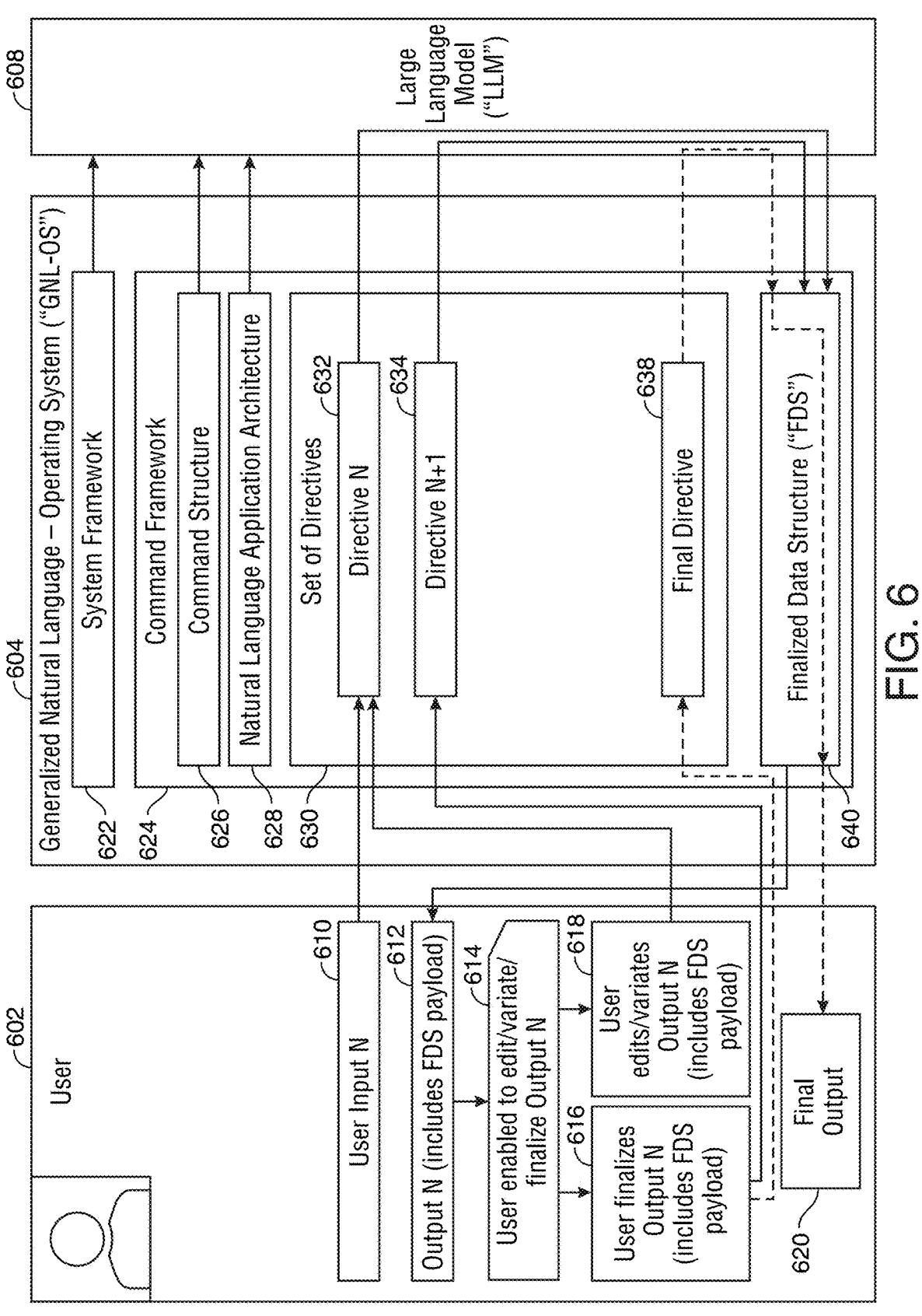
FIG. 6 shows another illustrative diagram in accordance with principles of the disclosure.

FIG. 6 shows an illustrative diagram. GNL-OS 604 may serve as a buffer in between user 602 and LLM 608. As discussed in FIG. 5, GNL-OS may include system framework 622. System framework 622 may include multiple components, such as those included in system framework 506 shown in FIG. 5. System framework 622 may be transmitted to LLM 608 prior to, and absent instructions from, user 602.

GNL-OS 604 may include command framework 624. Command framework 624 may include multiple components, such as those included in command framework 520. Command structure 626 may be similar to command structure 522, shown in FIG. 5. Command structure 522 may be transmitted to LIM 608. Natural language application architecture 628 may be similar to natural language application architecture 524, shown in FIG. 5. Natural language application architecture 628 may be transmitted to LLM 608.

Command framework 624 may also include set of directives 630. Set of directives 630 may include directive n, shown at 632, directive n+1, shown at 634 and final directive, shown at 638. There may be additional directives (not shown between directive n+1, shown at 634, and final directive, shown at 638.

User input n, shown at 610, may originate at user 602. User 602 may operate a computing device. User input n, shown at 610, may be electronically transmitted to GNL-OS 604. GNL-OS 604 may include user input n into directive n, shown at 632. Command framework 624 may input directive n (including user input n), shown at 632, into LLM 608. LLM may process directive n. Upon completion of processing directive n, LLM 608 may transmit an update to finalized data structure ("FDS") 640. GNL-OS 604 may transmit finalized data structure 640 to user 602. The finalized data structure 640 payload may be included in output n, shown at 612.

User 602 may be enabled to edit, variate and/or finalize output n, as shown at 614. When user 602 edits and/or variates output n, GNL-OS 604 may be triggered to execute directive n+1, shown at 634. Directive n+1, shown at 634, may be input to LLM 608. LLM 608 may process directive n+1. As an output to processing directive n+1, LLM 608 may output an update to finalized data structure 640. Finalized data structure 640 may be transmitted to user 602. The finalized data structure 640 payload may be included in output n, shown at 612. User 602 may be enabled to edit, variate and/or finalize output n, as shown at 614. User 602 may finalize output n, as shown at 616. Upon finalizing output n, GNL-OS 694 may trigger the execution of final directive 638. Execution of final directive 638 may or may not involve processing within LLM 608. Upon execution of final directive 638, finalized data structure 640 may be input into final output 620. Final output 620 may be presented or displayed to user 602.

It should be noted that LLM 608 may be limited with the quantity of received input LLM 608 can process. As such, LLM 608 may only be able to process input with a specific number of characters or words. Therefore, at times, LLM may process a specific number of characters in an input and disregard the remainder of the input. GNL-OS 604 may expand the input processible by LLM 608 because GNL-OS 604 may translate inputs by user 602 into data segments that are processible by LLM 608. GNL-OS 604 may maintain a working memory which stores data segments to be ingested by LLM 608, and stores data segments processed by LLM 608. This capability of GNL-OS 604 expands the operating capacity of LIM 608.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, described embodiments may take the form of an entirely software embodiment (including firmware, resident software, micro-code, and the like), an entirely hardware embodiment, or an embodiment combining software and hardware aspects that may generally be referred to herein as a "system." Furthermore, described embodiments may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the disclosure is implemented, the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other described embodiments, however, the computer-readable medium may be transitory, such as a propagation signal including computer-executable program code portions embodied therein.

It will also be understood that one or more computer-executable program code portions may be required on a specialized computer for carrying out the specialized operations, including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of described embodiments are written in conventional procedural programming languages, such as the "C" programming languages and/or similar programming languages. The computer program code may alternatively or additionally be written in one or more multi-paradigm programming languages, such as, for example, F #.

It will further be understood that some embodiments are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out described embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatus, and computer program products are provided for utilizing large language models to generate consistent data are provided. Persons skilled in the art will appreciate that the present invention can be practiced by other than the described embodiments, which are presented for purposes of illustration rather than of limitation.

What is claimed is:

1. A generalized natural language-operating system ("GNL-OS") for constraining a large language model ("LLM") to provide deterministic output, the system comprising:

a plurality of delivery frameworks, each delivery framework included in the plurality of delivery frameworks operable to deliver generalized natural language-program architecture natural language code ("GNL-PA NLC") to the LLM, said LLM operating on one or more hardware processors, the plurality of delivery frameworks comprising:

a system framework, said system framework operable to deliver a system prompt structured in GNL-PA NLC code to the LLM, said system prompt constraining the LLM to operate as an operative system, wherein upon receiving the system prompt the LLM operates as an operative system under one or more rules specified in the system prompt; and a command framework, said command framework operable to deliver GNL-PA code to the LLM, said GNL-PA code for one or more commands executable within the operative system;

wherein the GNL-PA NLC is a formal language that operates as computer code, said formal language comprising a collection of letters taken from an alphabet and formed according to a set of grammar rules, said GNL-PA NLC increases meaning density of programming when the GNL-PA NLC is interpreted through the LLM to direct operations of the one or more hardware processors.

2. The system of claim 1 wherein the system framework defines the system prompt.

3. The system of claim 1 wherein the system framework is not visible by a user.

4. A generalized natural language-operating system ("GNL-OS") for constraining a large language model ("LLM") to provide deterministic output, the system comprising:

a plurality of delivery frameworks, each delivery framework included in the plurality of delivery frameworks operable to deliver generalized natural language-program architecture natural language code ("GNL-PA NLC") to the LLM, said LLM operating on one or more hardware processors, the plurality of delivery frameworks comprising:

a system framework, said system framework operable to deliver a system prompt structured in GNL-PA NLC code to the LLM, said system prompt constraining the LLM to operate as an operative system, wherein upon receiving the system prompt the LLM operates as an operative system under one or more rules specified in the system prompt; and a command framework, said command framework operable to deliver GNL-PA code to the LLM, said GNL-PA code for one or more commands executable within the operative system;

wherein:

each delivery framework included in the plurality of delivery frameworks comprises a plurality of components, each component included in the plurality of components comprises a plurality of segments, each segment included in the plurality of segments comprises a plurality of sections, each section included in the plurality of sections comprises a plurality of subsections;

each component, segment, section and subsection comprises one or more precepts;

each precept is a sequential constraint structured as a hierarchy; and each precept is interpreted individually:

within the context of previous precepts in the hierarchy; and affects interpretation of following precepts.

5. A generalized natural language-operating system ("GNL-OS") for constraining a large language model ("LLM") to provide deterministic output, the system comprising:

a plurality of delivery frameworks, each delivery framework included in the plurality of delivery frameworks operable to deliver generalized natural language-program architecture natural language code ("GNL-PA NLC") to the LLM, said LLM operating on one or more hardware processors, the plurality of delivery frameworks comprising:

a system framework, said system framework operable to deliver a system prompt structured in GNL-PA NLC code to the LLM, said system prompt constraining the LLM to operate as an operative system, wherein upon receiving the system prompt the LLM operates as an operative system under one or more rules specified in the system prompt; and a command framework, said command framework operable to deliver GNL-PA code to the LLM, said GNL-PA code for one or more commands executable within the operative system;

wherein the system framework comprises:

a system structure, said system structure being an initial element received at the LLM, said system structure comprising a text component describing subsequent elements to be received at the LLM and instructions for executing the subsequent elements;

a GNL-PA syntax and semantic instructions, said GNL-PA syntax and semantic instructions directing the LLM to accurately interpret the GNL-PA NLC;

a system architecture, the system architecture comprising the GNL-PA NLC, the GNL-PA NLC instantiates one or more protocols upon occurrence of a specified event included in a plurality of specified events, the system architecture constrains the LLM to operate the one or more protocols in a reproducible set of circumstances;

a module declaration, said module declaration translate the specified event, linked to the one or more protocols instantiated in response to the specified event, to one or more specific transformer blocks;

a command language architecture, said command language architecture linking each term, included in a plurality of terms, to a deterministic interpretation, included in a plurality of deterministic interpretations, said command language architecture setting each term, included in the plurality of terms, with a variable dynamic link to other terms included in the plurality of terms; and a boot procedure, said boot procedure instructs the LLM to translate inputs input by a command structure, included in the command framework, into operational vector data.

6. A generalized natural language-operating system ("GNL-OS") for constraining a large language model ("LLM") to provide deterministic output, the system comprising:

a plurality of delivery frameworks, each delivery framework included in the plurality of delivery frameworks operable to deliver generalized natural language-program architecture natural language code ("GNL-PA NLC") to the LLM, said LLM operating on one or more hardware processors, the plurality of delivery frameworks comprising:

a system framework, said system framework operable to deliver a system prompt structured in GNL-PA NLC code to the LLM, said system prompt constraining the LLM to operate as an operative system, wherein upon receiving the system prompt the LLM operates as an operative system under one or more rules specified in the system prompt; and a command framework, said command framework operable to deliver GNL-PA code to the LLM, said GNL-PA code for one or more commands executable within the operative system, wherein the command framework comprises:

a command structure, said command structure comprising a text component that delineates the command framework to the LLM;

a natural language application architecture, said natural language application architecture defining a data structure to which a GNL-OS-based application conforms;

one or more directives, each of said one or more directives comprising operational instructions interpretable by the LLM; and a finalized data structure, said finalized data structure comprising output of the LLM in response to the one or more directives.

7. The system of claim 6 wherein the command framework delivers the following components of the command structure in a sequential order: the command structure, the natural language application architecture, the one or more directives and the finalized data structure.

8. The system of claim 6 wherein:

the command framework sequentially processes the one or more directives; and the finalized data structure is updated upon processing each directive.

9. A method for constraining a large language model ("LLM") to provide deterministic output, said LLM operating on one or more hardware processors, the method comprising:

delivering, from a system framework to the LLM, a system prompt structured in generalized natural language-program architecture natural language code ("GNL-PA NLC"), said system prompt constraining the LLM to operate as an operative system, wherein upon receiving the system prompt, the LLM operates as an operative system under one or more rules specified in the system prompt; and delivering, from a command framework to the LLM, GNL-PA code, said GNL-PA code for one or more commands executable within the operative system;

wherein the GNL-PA NLC is a formal language that operates as computer code, said formal language comprising a collection of letters retrieved from an alphabet and formed according to a set of grammar rules, said GNL-PA NLC increasing meaning density of programming when the GNL-PA NLC is interpreted through the LLM to direct operations of the one or more hardware processors.

10. The method of claim 9 wherein the system framework defines the system prompt.

11. The method of claim 9 wherein the system framework is not visible by a user.

12. A method for constraining a large language model ("LLM") to provide deterministic output, said LLM operating on one or more hardware processors, the method comprising:

delivering, from a system framework to the LLM, a system prompt structured in generalized natural language-program architecture natural language code ("GNL-PA NLC"), said system prompt constraining the LLM to operate as an operative system, wherein upon receiving the system prompt, the LLM operates as an operative system under one or more rules specified in the system prompt; and delivering, from a command framework to the LLM, GNL-PA code, said GNL-PA code for one or more commands executable within the operative system;

wherein:

the system framework includes a plurality of components, each component included in the system framework comprises a plurality of segments, each segment included in the plurality of segments comprises a plurality of sections, each section included in the plurality of sections comprises a plurality of subsections;

each component, segment, section and subsection comprises one or more precepts;

each precept is a sequential constraint structured as a hierarchy; and each precept is interpreted individually:

within the context of previous precepts in the hierarchy; and affects interpretation of following precepts.

13. A method for constraining a large language model ("LLM") to provide deterministic output, said LLM operating on one or more hardware processors, the method comprising:

delivering, from a system framework to the LLM, a system prompt structured in generalized natural language-program architecture natural language code ("GNL-PA NLC"), said system prompt constraining the LLM to operate as an operative system, wherein upon receiving the system prompt, the LLM operates as an operative system under one or more rules specified in the system prompt; and delivering, from a command framework to the LLM, GNL-PA code, said GNL-PA code for one or more commands executable within the operative system;

wherein:

the command framework includes a plurality of components, each component included in the command framework comprises a plurality of segments, each segment included in the plurality of segments comprises a plurality of sections, each section included in the plurality of sections comprises a plurality of subsections;

each component, segment, section and subsection comprises one or more precepts;

each precept is a sequential constraint structured as a hierarchy; and each precept is interpreted individually:
    within the context of previous precepts in the hierarchy;
        and
    affects interpretation of following precepts.

14. A method for constraining a large language model ("LLM") to provide deterministic output, said LLM operating on one or more hardware processors, the method comprising:
    delivering, from a system framework to the LLM, a system prompt structured in generalized natural language-program architecture natural language code ("GNL-PA NLC"), said system prompt constraining the LLM to operate as an operative system, wherein upon receiving the system prompt, the LLM operates as an operative system under one or more rules specified in the system prompt; and
    delivering, from a command framework to the LLM, GNL-PA code, said GNL-PA code for one or more commands executable within the operative system;
    wherein the system prompt comprises:
        a system structure, said system structure being an initial element received at the LLM, said system structure comprising a text component describing subsequent elements to be received at the LLM and instructions for executing the subsequent elements;
        a GNL-PA syntax and semantic instructions, said GNL-PA syntax and semantic instructions directing the LLM to accurately interpret the GNL-PA NLC;
        a system architecture, the system architecture comprising the GNL-PA NLC, the GNL-PA NLC instantiates one or more protocols upon occurrence of a specified event included in a plurality of specified events, the system architecture constrains the LLM to operate the one or more protocols in a reproducible set of circumstances;
        a module declaration, said module declaration translating the specified event, linked to the one or more protocols instantiated in response to the specified event, to one or more specific transformer blocks;
        a command language architecture, said command language architecture linking each term, included in a plurality of terms, to a deterministic interpretation, included in a plurality of deterministic interpretations, said command language architecture setting each term, included in the plurality of terms, with a variable dynamic link to other terms included in the plurality of terms; and
        a boot procedure, said boot procedure instructs the LLM to translate inputs input by a command structure, included in the command framework, into operational vector data.

15. A method for constraining a large language model ("LLM") to provide deterministic output, said LLM operating on one or more hardware processors, the method comprising:
    delivering, from a system framework to the LLM, a system prompt structured in generalized natural language-program architecture natural language code ("GNL-PA NLC"), said system prompt constraining the LLM to operate as an operative system, wherein upon receiving the system prompt, the LLM operates as an operative system under one or more rules specified in the system prompt; and
    delivering, from a command framework to the LLM, GNL-PA code, said GNL-PA code for one or more commands executable within the operative system;
    wherein the command framework comprises:
        a command structure, said command structure comprising a text component that delineates the command framework to the LLM;
        a natural language application architecture, said natural language application architecture defining a data structure to which a GNL-OS-based application conforms;
        one or more directives, each of said one or more directives comprising operational instructions interpretable by the LLM; and
        a finalized data structure, said finalized data structure comprising output of the LLM in response to the one or more directives.

16. The system of claim 15 wherein the command framework delivers the following components of the command structure in a sequential order: the command structure, the natural language application architecture, the one or more directives and the finalized data structure.

17. The system of claim 15 wherein:
    the command framework sequentially processes the one or more directives; and
    the finalized data structure is updated upon processing each directive.

18. An artificial intelligence ("AI") interface operating on a processor in combination with a memory, the AI interface comprising:
    an application programming interface ("API"), said API in electronic communication with a large language model ("LLM");
    a defined program architecture;
    a set of directives;
    a finalized data structure, the finalized data structure is updated at upon conclusion of execution of each directive included in the set of directives; and
    a set of input format benchmarks for an input expected within the execution of each directive; and
    a set of output format benchmarks for an output expected within the execution of each directive;
wherein:
    the set of directives are configured to be executed sequentially; and
    a single execution of the AI interface is executed by a command, said single execution of the AI interface instantiating the API to electronically communicate with the LLM, said command being an input created from a sequentially appended contents of:
        a command structure;
        the defined program architecture;
        a selected directive from the set of directives being currently executed;
        the finalized data structure;
        the set of input format benchmarks; and
        the set of output format benchmarks.

* * * * *